United States Patent [19]

Steiner

[11] Patent Number: 5,029,885
[45] Date of Patent: Jul. 9, 1991

[54] AXLE ARRANGEMENT

[75] Inventor: Helmut Steiner, Wiehl, Fed. Rep. of Germany

[73] Assignee: Bergische Achsenfabrik Fr. Kotz & Söhne, Wiehl, Fed. Rep. of Germany

[21] Appl. No.: 514,745

[22] Filed: Apr. 26, 1990

[30] Foreign Application Priority Data

Apr. 26, 1989 [DE] Fed. Rep. of Germany ....... 3913697

[51] Int. Cl.$^5$ .............................................. B60G 11/04
[52] U.S. Cl. ................................... 280/96.1; 280/660; 301/124 R
[58] Field of Search .............. 280/675, 691, 661, 771, 280/668, 96.1, 660; 301/124 R, 125

[56] References Cited

U.S. PATENT DOCUMENTS

| 3,241,854 | 3/1966 | Hamilton | 280/95 |
| 4,708,363 | 11/1987 | Hata | 280/96.1 |
| 4,722,540 | 2/1988 | Kozyra et al. | 280/96.1 |
| 4,948,161 | 8/1990 | Tonomura | 240/96.1 |

FOREIGN PATENT DOCUMENTS

| 1189870 | 7/1962 | Fed. Rep. of Germany . |
| 6934235 | 8/1969 | Fed. Rep. of Germany . |
| 1810261 | 3/1970 | Fed. Rep. of Germany . |
| 1959496 | 6/1971 | Fed. Rep. of Germany . |
| 1655138 | 10/1971 | Fed. Rep. of Germany . |
| 2312565 | 9/1974 | Fed. Rep. of Germany . |
| 8911790 | 4/1989 | Fed. Rep. of Germany . |
| 2597800 | 4/1986 | France . |

Primary Examiner—Richard A. Bertsch
Attorney, Agent, or Firm—Robert W. Becker & Associates

[57] ABSTRACT

An axle arrangement for a vehicular trailer is provided. This arrangement includes at least one rigid guide axle and therebehind a follower steering axle having wheel and tire assemblies that are connected to a rigid axle member via control levers and are interconnected via a tie bar. The axle members of the guide axle and of the follower steering axle are supported via connecting springs on brackets and pneumatic cushioning bellows that are secured to the chassis of the trailer. So that the follower steering axle can have the same connection dimension relative to the longitudinal members of the trailer as does the rigid guide axle, the connecting springs of the follower steering axle, between the forward brackets and the axle member, are bent inwardly toward the center of the axle member by an amount that is equal at most to half the difference between a center to center distance of the connecting springs of the rigid guide axle and the follower steering axle.

1 Claim, 3 Drawing Sheets

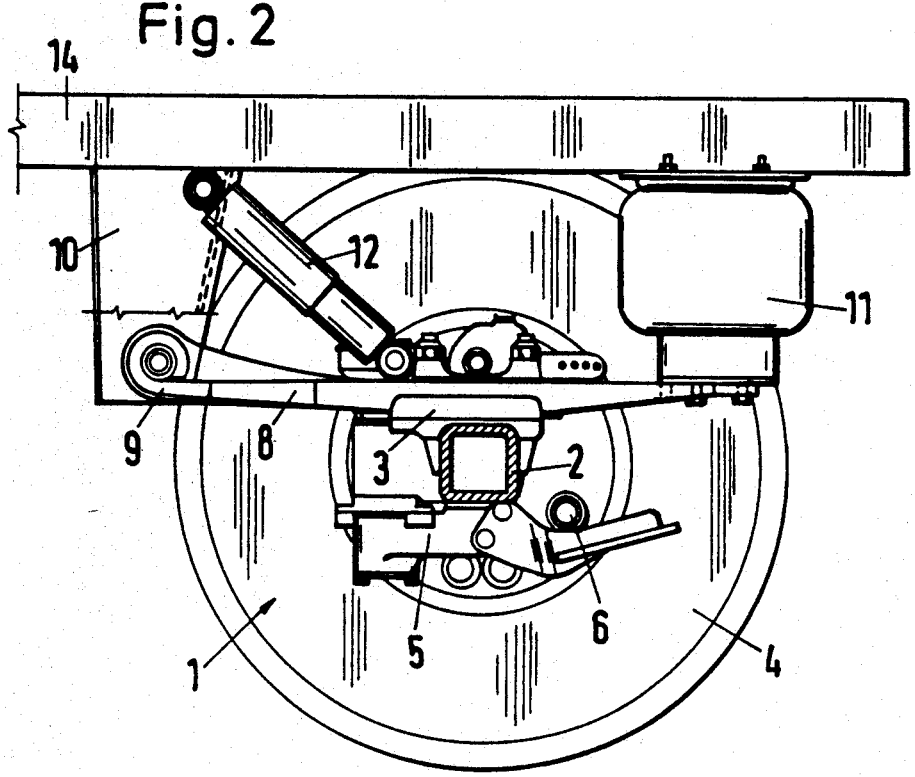
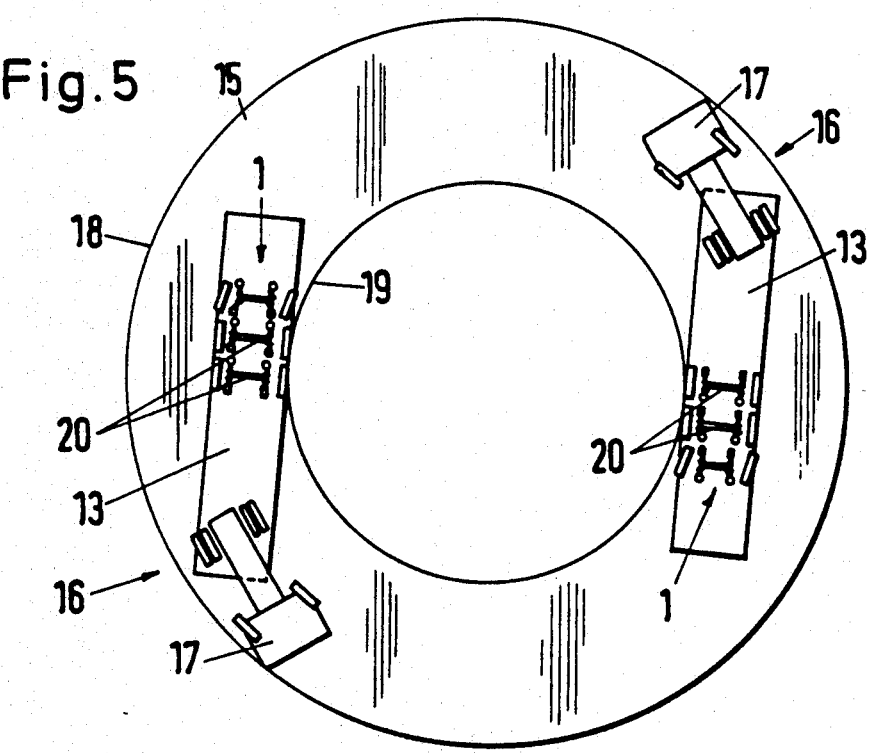

AXLE ARRANGEMENT

BACKGROUND OF THE INVENTION

The present invention relates to an axle arrangement for a vehicular trailer, and includes at least one rigid guide axle and therebehind a follower steering axle having wheel and tire assemblies that are connected to a rigid axle member via control levers and are interconnected via a tie bar, whereby the axle members of the guide axle and of the follower steering axle are supported via connecting springs on brackets and pneumatic cushioning bellows that are secured to the chassis of the trailer.

German Patent 18 10 261 discloses a follower steering axle for a vehicular trailer. Follower steering axles of this known type are generally combined either with one rigid guide axle to form a dual axle arrangement, or are combined with two rigid guide axles to form a triple axle arrangement. The purpose of the follower steering axle is to improve the tracking behavior of the vehicular trailer as it travels through curves.

With dual and triple axle arrangements having a follower steering axle, an installation problem results due to the different center to center distances of the springs of the rigid guide axle and of the follower steering axle. In particular, the spacing between the longitudinal members of the vehicular trailer correspond to the center to center distance to the spring of the rigid guide axle, so that the brackets, connecting springs, and pneumatic cushioning bellows on each side of the trailer can be disposed in the vertical plane of the longitudinal members. However, this is not possible with the follower steering axle because the control levers still have to be disposed between the wheel and tire assemblies, which of course have the same wheel track as the wheel and tire assemblies of the rigid guide axle; in addition, the pneumatic cushioning bellows must be offset inwardly so that the wheel and tire assemblies can move inwardly. With the heretofore known axle arrangement having a follower steering axle, this installation problem is resolved by not securing the forward bracket for the connecting spring of the follower steering axle in the plane of and directly below the longitudinal members of the vehicular trailer, but rather by offsetting these brackets inwardly by half the difference between the center to center distances between the springs and next to the plane of the longitudinal members of the trailer. The distance or offset between the longitudinal members and the brackets is bridged via auxiliary constructions that on the one hand are welded and/or otherwise secured to the longitudinal members and on the other hand are secured to the brackets. These auxiliary constructions require not only an increased expense for installation and assembly, but rather are subjected for static reasons to particular stress and therefore represent a weak point.

Starting from the above, it is an object of the present invention to provide an axle arrangement that has at least one rigid guide axle and a follower steering axle, and which despite different center to center distances of the springs of the two axles provides the same connecting dimensions relative to the longitudinal members of the vehicular trailer.

BRIEF DESCRIPTION OF THE DRAWINGS

This object, and other objects and advantages of the present invention, will appear more clearly from the following specification in conjunction with the accompanying schematic drawings, in which:

FIG. 2 is a cross-sectional side view through the follower steering axle of FIG. 1 taken along the line II—II thereof;

FIG. 5 shows a regulation work circle in which are indicated tractor-trailers, the trailers of which are provided with triple axle arrangements having a follower steering axle.

SUMMARY OF THE INVENTION

The axle arrangement of the present invention is characterized primarily in that the connecting springs of the follower steering axle, between the forward brackets and the axle member, are bent in the direction toward the center of the axle by an amount that is equal at most to half the difference between the center to center distances of the connecting springs of the two axles.

With an axle arrangement that has the configuration pursuant to the present invention, the distance between the center lines of the longitudinal members, i.e. the forward brackets that are secured therebelow, and the center lines of axle tangs secured to the axle member of the follower steering axle, is bridged by the inventively shaped connecting springs, which are supported on the axle tangs. The advantage associated with this is that the follower steering axle has the same connection dimensions relative to the longitudinal members of the vehicular trailer as do the rigid guide axles that are disposed ahead of the follower steering axle. The forward brackets of the follower steering axle ca also be secured perpendicularly below the longitudinal members of the trailer. At the rear end, the distance between the connecting springs and the longitudinal members of the trailer can be bridged in a known manner via the pneumatic cushioning bellows or their connector plates. The connecting springs or ribs are components that by means of an appropriate dimensioning are readily in a position to absorb stresses and moments that occur during static and dynamic driving operations and to convey these stresses and moments from the axle into the frame of the vehicle. In this way, the present invention makes a considerable contribution to safety in traffic.

Further specific features of the present invention will be described in detail subsequently.

DESCRIPTION OF PREFERRED EMBODIMENTS

Figure 1:
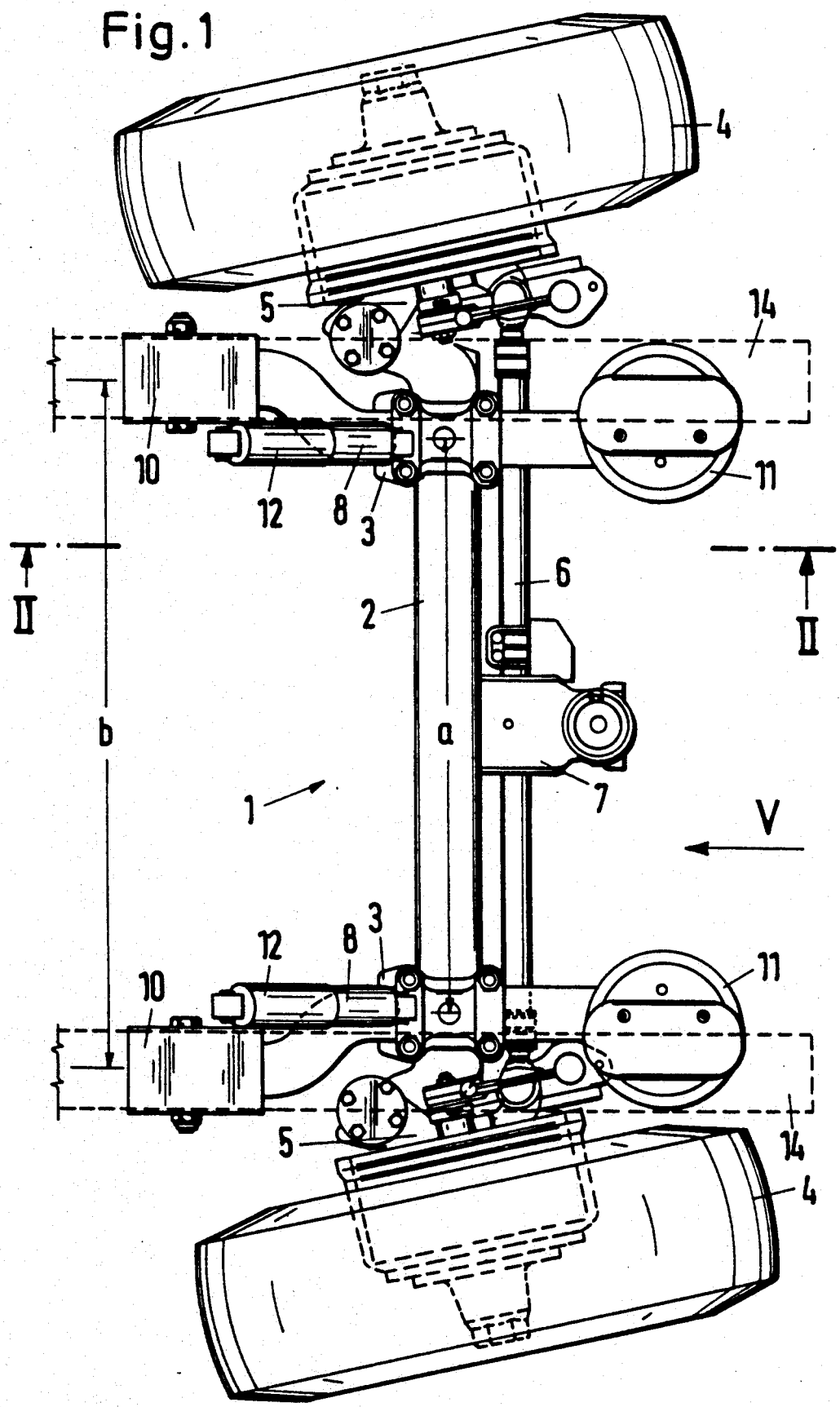
FIG. 1 is a plan view showing one exemplary embodiment of the follower steering axle of the present invention.

Referring now to the drawings in detail, the follower steering axle 1 illustrated in FIGS. 1 and 2 is provided with an axle member or beam 2 that has axle tangs 3, wheel and tire assemblies 4 that are connected to the axle member 2 via control levers 5, and a tie bar 6 that interconnects the control levers 5. Disposed between the tie bar 6 and the axle member 2 is a stabilization mechanism 7.

Secured to the axle tangs 3 are steering or connecting springs or ribs 8, the front end of which, as viewed in the forward direction of travel V, are linked to a bracket 10 via a spring eye 9, while the rear end thereof is connected with the cup of a pneumatic cushioning bellows 11. Shock absorbers 12 are disposed between the axle member 2 and the brackets 10.

Figure 3:
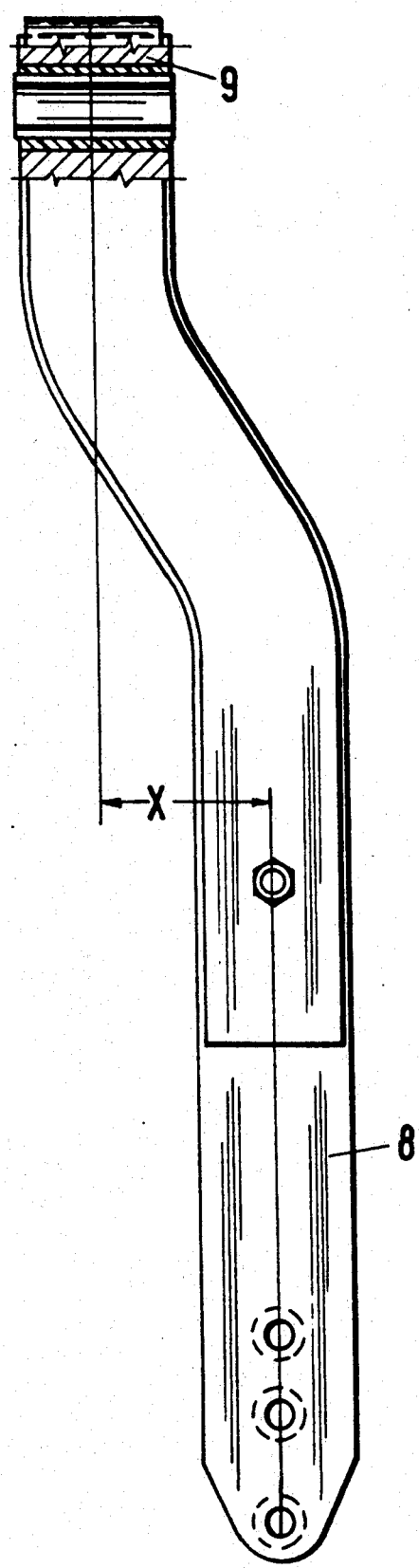
FIG. 3 is a plan view showing a bent connecting spring.
Figure 4:
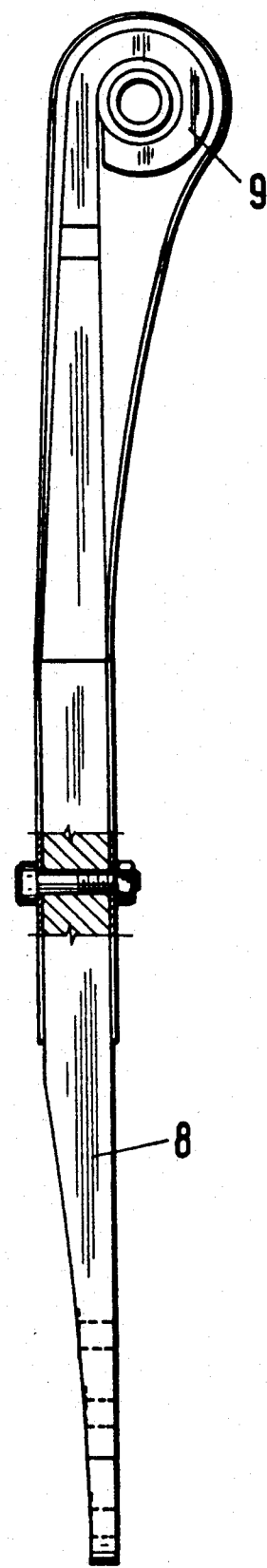
FIG. 4 is a side view of the connecting spring of FIG. 3.

During installation of the follower steering axle 1 below a vehicular trailer 13, the brackets 10 and the pneumatic cushioning bellows 11 are secured below longitudinal members 14 of a chassis frame. In so doing, a differential "x" (FIG. 3) results between the center to center distance "a" for the axle tangs 3 or connecting springs 8 on the axle member 2, and the center to center distance "b" of the longitudinal members 14 or brackets 10, because the control levers 5 still have to be dispose between the wheel and tire assemblies 4 and the axle tangs 3 for the connecting springs 8. The offset between the respective axle tangs 3 and brackets 10 is bridged by the connecting springs 8, which for this purpose are bent inwardly between the axle tangs 3 and the brackets 10 by the differential "x"; this differential amount "x" corresponds to half the difference between the spring center to center distances "b" of the guide axle 20 and "a" of the follower steering axle 1.

FIG. 5 illustrates a BO or regulation work circle 15 in which two tractor-trailers 16 are indicated. While the tractors 17 are driving along the outer circle 18, which can have a maximum diameter of 12 m, the axle arrangement of the trailer 13 runs along the inner circle 19, which can have a diameter of no less than 5.3 m. In order to improve the steering or tracking behavior of the vehicular trailer 13, the axle arrangement thereof comprises two rigid guide axles 20 and a follower steering axle 1 that is disposed behind them. As can be seen from FIG. 5, the spring center to center distance of the two guide axles 20 is greater than the spring center to center distance of the follower steering axle 1. The longitudinal members 14 of the trailer 13 extend in line with the brackets and connecting springs of the two guide axles 20. This is what causes the assembly and installation problem for the follower steering axle 1, which is optimally resolved with the present invention.

The present invention is, of course, in no way restricted to the specific disclosure of the specification and drawings, but also encompasses any modifications within the scope of the appended claim.

What I claim is:

1. In an axle arrangement for a vehicular trailer including at least one rigid guide axle and therebehind, as viewed in a forward direction of travel of said trailer, a follower steering axle having wheel and tire assemblies that are connected to a rigid axle member via control levers and are interconnected via a tie bar, whereby the axle members of said guide axle and said follower steering axle are supported via connecting springs on brackets and pneumatic cushioning bellows that are secured to the chassis of said trailer, the improvement wherein:

said connecting springs of said follower steering axle, between brackets forward of said rigid axle member, and said axle member itself, are bent inwardly in a direction toward the center of said axle by an amount that is equal at most to half the difference between a center to center distance between said connecting springs of said guide axle and a center to center distance between said connecting springs of said follower steering axle as measured at said rigid axle member thereof.

* * * * *